United States Patent [19]

Priatko et al.

[11] Patent Number: 4,881,190

[45] Date of Patent: Nov. 14, 1989

[54] DIGITALLY PROGRAMMABLE SIGNAL GENERATOR AND METHOD

[75] Inventors: Gordon J. Priatko, Oakland; Jeffrey A. Kaskey, San Leandro, both of Calif.

[73] Assignee: The United States of America as represented by the United States Department of Energy, Washington, D.C.

[21] Appl. No.: 902,843

[22] Filed: Sep. 2, 1986

[51] Int. Cl.[4] .............................................. G06F 3/00
[52] U.S. Cl. .................................................... 364/718
[58] Field of Search ................................ 364/718–721, 364/821

[56] References Cited

U.S. PATENT DOCUMENTS

| | | | |
|---|---|---|---|
| 4,283,768 | 8/1981 | Scott | 364/718 |
| 4,404,644 | 9/1983 | Howie | 364/718 |
| 4,424,730 | 1/1984 | Ezawa | 364/718 |
| 4,468,639 | 8/1984 | Green et al. | 364/821 |
| 4,710,891 | 12/1987 | Debus, Jr. et al. | 364/718 |

Primary Examiner—Gary V. Harkcom
Assistant Examiner—Long T. Nguyen
Attorney, Agent, or Firm—Miguel A. Valdes; Roger S. Gaither; Jason R. Hightower

[57] ABSTRACT

A digitally programmable waveform generator for generating completely arbitrary digital or analog waveforms from very low frequencies to frequencies in the gigasample per second range. A memory array with multiple parallel outputs is addressed; then the parallel output data is latched into buffer storage from which it is serially multiplexed out at a data rate many times faster than the access time of the memory array itself. While data is being multiplexed out serially, the memory array is accessed with the next required address and presents its data to the buffer storage before the serial multiplexing of the last group of data is completed, allowing this new data to then be latched into the buffer storage for smooth continuous serial data output. In a preferred implementation, a plurality of these serial data outputs are paralleled to form the input to a digital to analog converter, providing a programmable analog output.

10 Claims, 5 Drawing Sheets

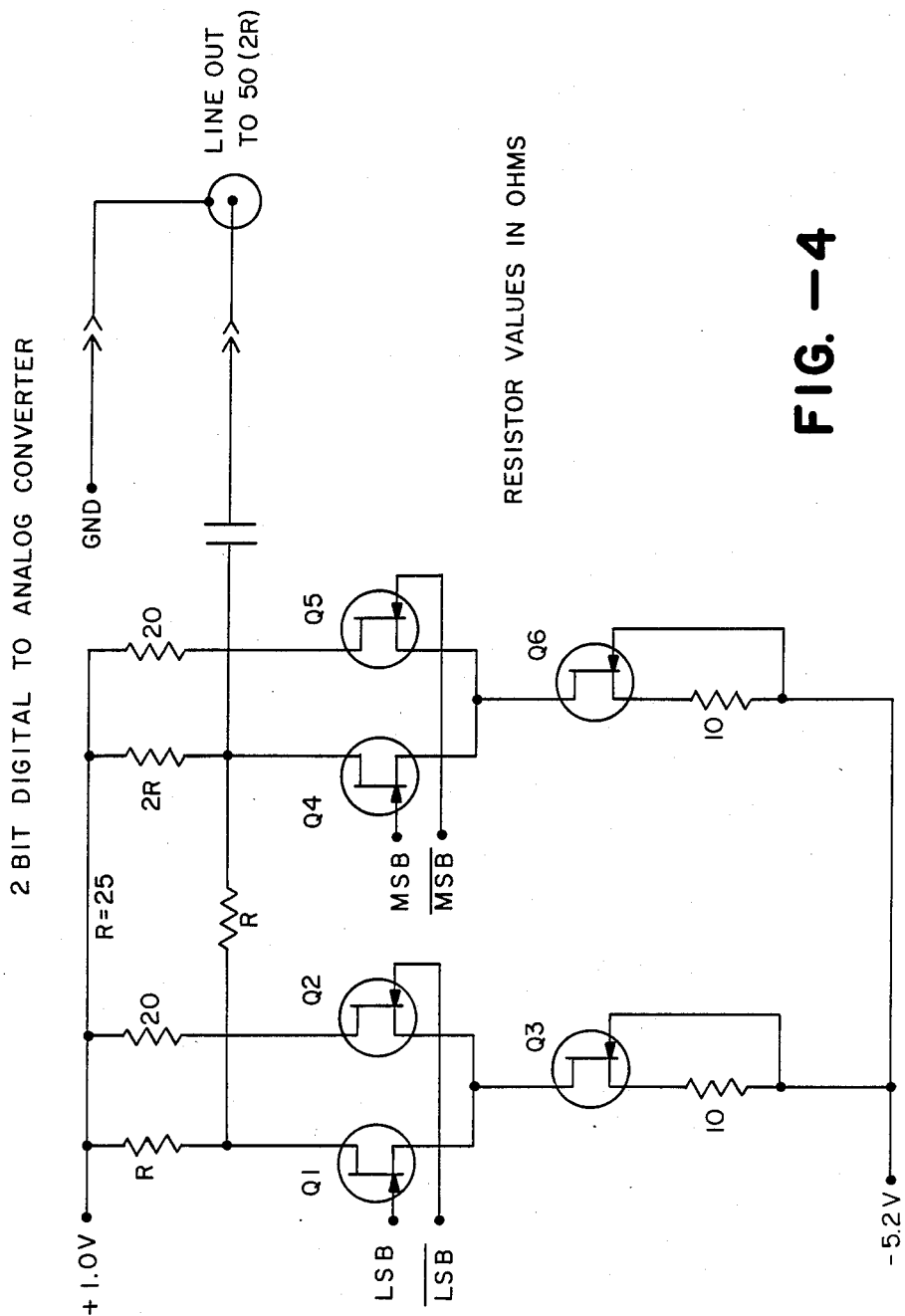
FIG.—4

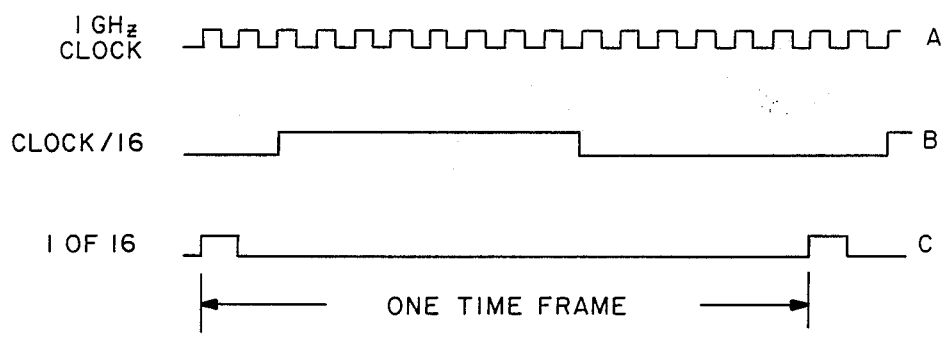
FIG. —5
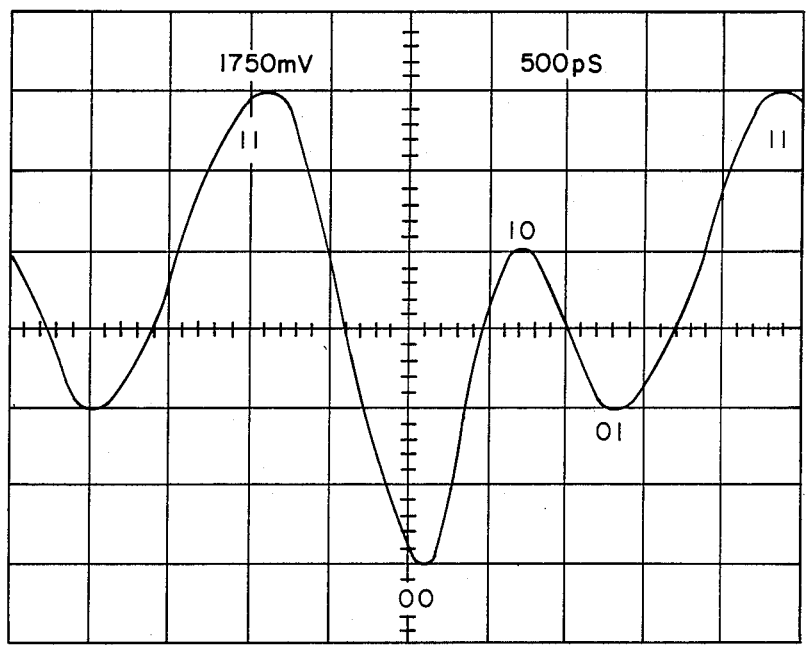
FIG. —6

DIGITALLY PROGRAMMABLE SIGNAL GENERATOR AND METHOD

FIELD OF THE INVENTION

The United States Government has rights in this invention pursuant to Contract No. W-7405 ENG 48 between the United States Department of Energy and the University of California for the operation under Lawrence Livermore National Laboratory.

BACKGROUND OF THE INVENTION

The present invention relates to a digitally programmable signal generator (DPSG) and method. Digitally programmable signal generation is a well known art, the essence of which is the creation of digital and analog signals which are specified by digitally encoded data stored in a primary memory means. The digital data stored in the primary memory means is either converted directly into an output signal or may be multiplexed into secondary (higher speed) memory means and then converted into the output signal. Existing methods for generating digitally programmable signals are constrained to operate at clock rates of less than one gigahertz (1 GHz). The present invention extends the operation of DPSGs into the GHz range, while preserving all of the current art's DPSGs' operational features. The construction of GHz clock rate DPSGs allows for the production of digital and analog signals with nanosecond (ns) and subnanosecond features. The present invention permits the use of lower speed (hence less expensive) components as the primary memory means of the DPSG.

In applications such as Atomic Vapor Laser Isotope Separation (AVLIS) wherein the isotopic ratios of materials are modified via an isotope specific photoionization process, the efficiency of the process is related to the spectral bandwidth of the lasers. The use of GHz bandwidth DPSGs will enable implementation of optimal laser spectral forms. Previous approaches in such AVLIS applications have not been optimal.

In addition to AVLIS processes, DPSGs are currently in use in a wide range of other fields including spectroscopy, telecommunication, computer science, radar, laser-radar, ECM (Electronic countermeasure) systems and test equipment. All of these fields contain applications in which GHz bandwidth DPSGs would be of great value.

SUMMARY OF THE INVENTION

It is an object of the present invention to provide an improved digitally programmable signal generator and method.

It is a more particular object of the present invention to provide an improved digitally programmable signal generator and method which can operate in the gigahertz range, for applications in spectroscopy, telecommunication, computer science, radar, laser-radar, ECM (Electronic countermeasures) systems, test equipment, and an AVLIS process, as described above.

The present invention includes a DPSG operating in successive clock cycles where the generator includes first memory means for storing digital data in a plurality of addressable memory locations. Each of the first memory means has a first access time such that selectable stored digital data is accessible after that first access time. For purposes of describing the operation of the present invention, the term "access time" can be defined as the time interval between the instant at which data are called for from a storage device and the instant delivery of that data is completed.

The DPSG also includes second memory means and means for copying a portion of the digital data stored in the first memory means from the first memory means into the second memory means.

The DPSG also includes means for multiplexing the second stored digital data from the second memory means within a second access time faster than the first access time. This data may be used in two ways. The data may be propagated as a very high speed digital data stream or the digital data may be converted into an analog waveform by means of a Digital to Analog Converter (DAC).

Other objects, features and advantages of the present invention will become apparent from the following detailed description when taken in conjunction with the accompanying drawings.

BRIEF DESCRIPTION OF THE DRAWINGS

The accompanying drawings, which are incorporated in and form a part of this specification, illustrate two preferred embodiments of the invention and, together with the following description, serve to explain the principles of the invention.

FIG. 4 depicts a schematic diagram of a digital to analog converter for use in the system of FIG. 1.

FIG. 5 depicts a timing diagram for describing the operation of the output memory controllers which are depicted in FIGS. 2–3.

FIG. 6 depicts the output of a pre-prototype digital to analog converter according to FIG. 4.

DETAILED DESCRIPTION OF THE DRAWINGS

Reference will now be made in detail to preferred embodiments of the invention, examples of which are illustrated in the accompanying drawings. While the invention will be described in conjunction with those preferred embodiments, it will be understood that the intent is not to limit the invention to these embodiments. On the contrary, the intent is to cover alternatives, modifications and equivalents as may be included within the spirit of the invention as defined by the appended claims.

Figure 1:
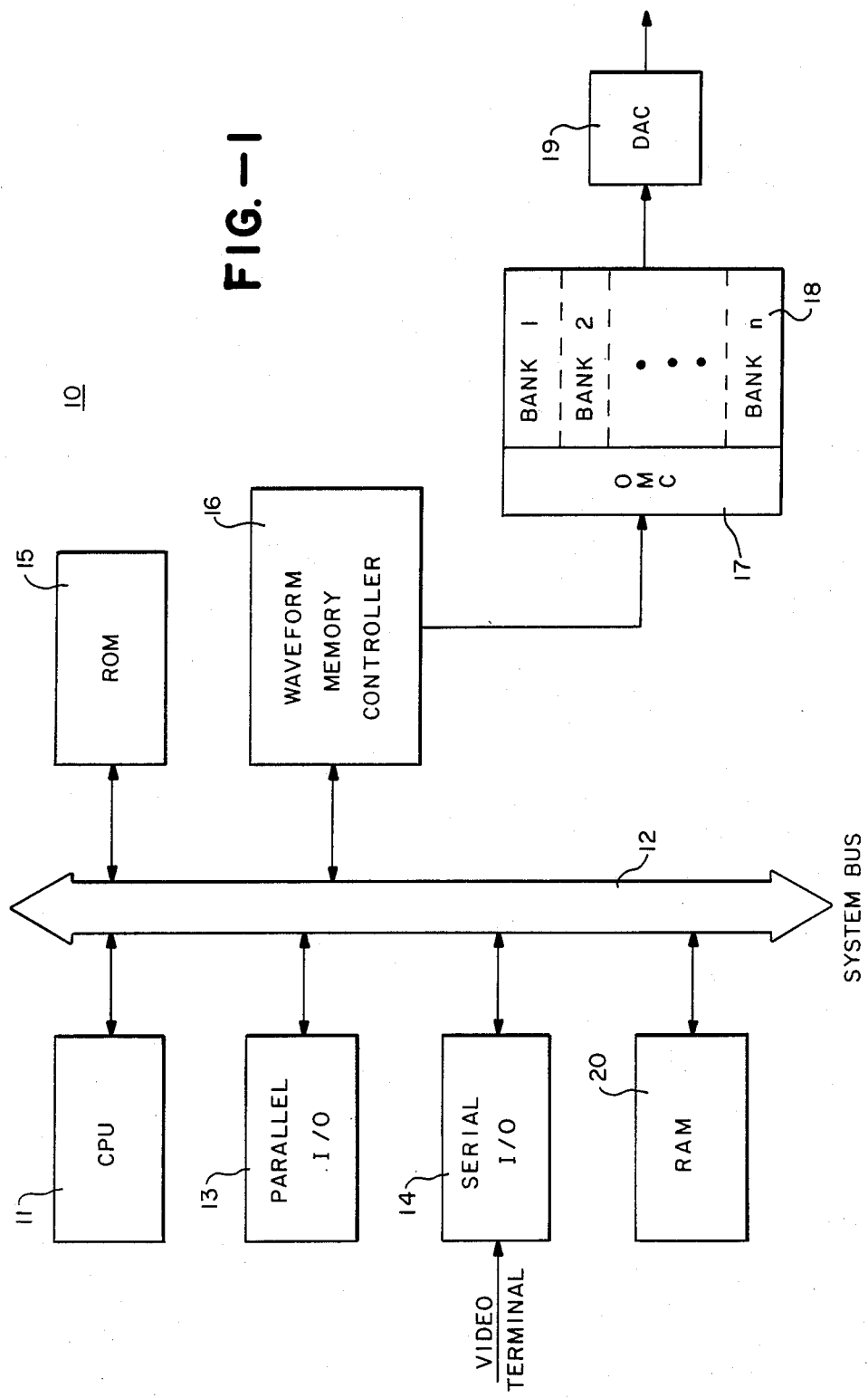
FIG. 1 depicts a block diagram of a digital signal generator system according to the present invention.

Referring now to FIG. 1, a system block diagram of a DPSG 10 is depicted.

The system 10 components include a central processing unit (CPU) 11 connected to the other components via a system bus 12 for controlling the overall operation of the system 10.

System 10 includes read only memory (ROM) 15, system random access memory (RAM) 20, a parallel input/output (I/O) interface 13 and a serial I/O interface 14 (which can be connected to a video display terminal).

In addition, the block diagram of the present invention depicted in FIG. 1 includes a waveform memory controller 16, connected to the system bus 12. The waveform memory controller 16 is also connected to the output memory controller (OMC) 17 and output memory 18. The waveform memory controller 16 controls the transfer of digital data from either RAM 20 or ROM 15 to the output memory 18. This transfer can be effected in a known fashion and hence need not be described in detail. The output memory 18 is divided into N banks where N is equal to the number of bits of resolution of the digital to analog converter 19. Each bank of the output memory 18 is architecturally equivalent to and operates in parallel with the other banks and is controlled by a common output memory controller 17.

The output memory controller 17 and output memory 18 are in turn connected to a digital to analog converter 19.

Figure 2:
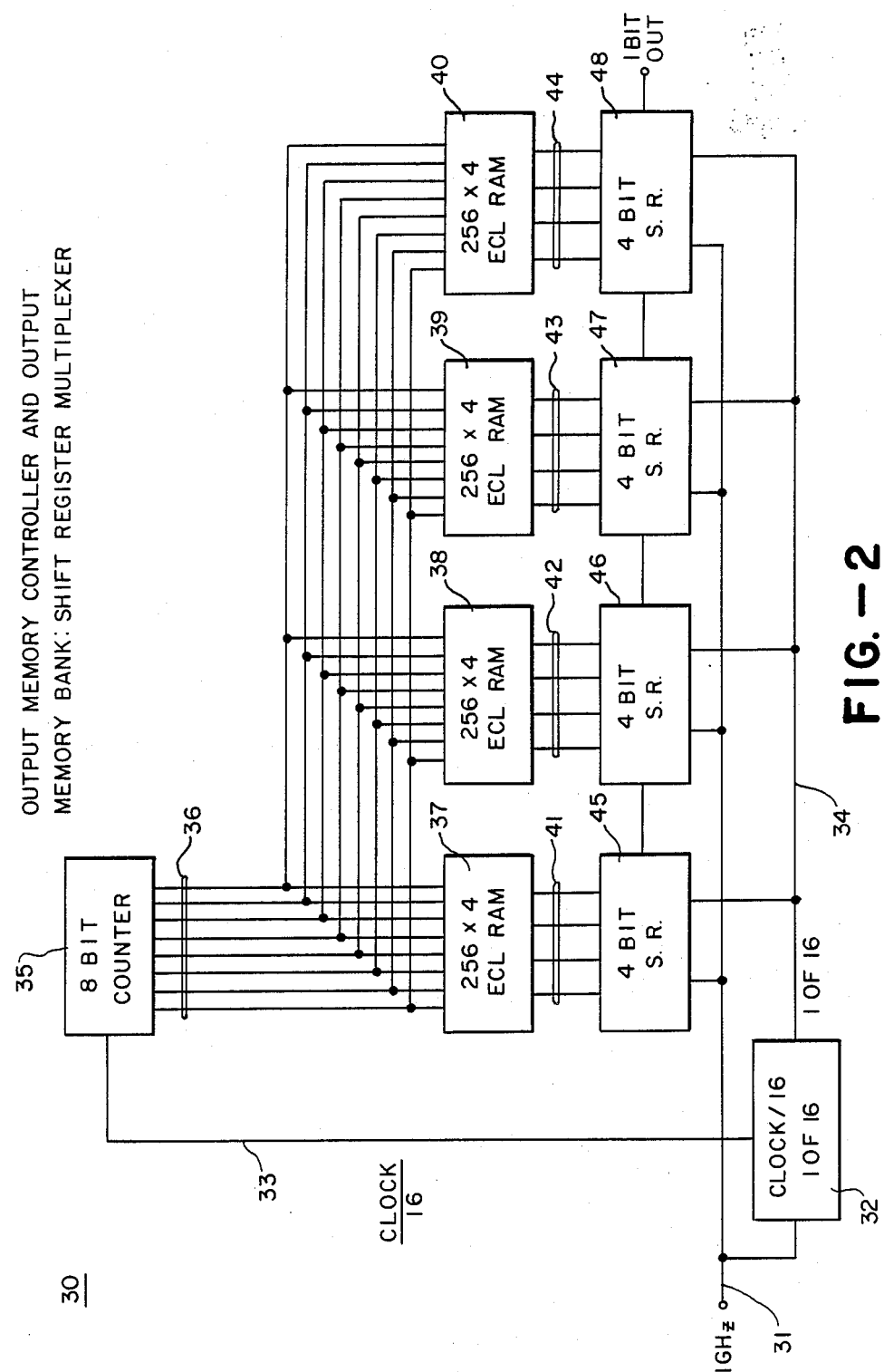
FIG. 2 depicts a block diagram of a preferred embodiment of the output memory controller and of one bank of the output memory which forms a portion of FIG. 1.

Referring now to FIG. 2, a block diagram of a preferred embodiment of the output memory controller 17 and of one bank of the output memory 18 of FIG. 1 is depicted. Digital data is transferred from a first memory means (such as the system RAM 20 in FIG. 1) and stored in a second memory means, such as the 7 ns 256×4 Emitter Coupled Logic (ECL) memories 37, 38, 39, 40, under control of the waveform memory controller 16 of FIG. 1. The interface between the waveform memory controller 16 of FIG. 1 and the output memory controller 17 of FIG. 1 is not shown in FIG. 2.

In FIG. 2, a fast clock, given as 1 GHz in this embodiment, is input on lead 31 to control circuit 32, which in turn produces a clock/16 signal on lead 33 and a 1 of 16 signal on lead 34. FIG. 5 depicts the 1 GHz clock signal (FIG. 5A), the clock/16 access signal (FIG. 5B) and the 1 of 16 signal (FIG. 5C).

In FIG. 5, the occurrence of the 1 of 16 clock signal (FIG. 5C) can be characterized, for descriptive purposes, as initiating sequential time frames where each time frame includes sixteen 1 GHz clock pulses (FIG. 5A) and where a clock/16 access signal (FIG. 5B) also occurs.

The ECL memories 37–40 are addressed by an 8-bit counter 35, which is incremented by the clock/16 signal on lead 33. The ECL memories produce their output data on signal buses 41, 42, 43, 44.

The 4-bit Gallium Arsenide (GaAs) shift registers 45, 46, 47, 48 receive and latch the data present on buses 41, 42, 43 and 44 (respectively) under control of the 1 of 16 signal on lead 34.

In operation of the output memory controller 17 and of this bank of the output memory 30 of FIG. 2, addressing of the RAMs 37–40 is initiated by the clock/16 signal on lead 33. This increments the 8 bit counter 35 which provides a new address to the RAMs 37–40 via bus 36. After the access time of the RAMs has elapsed, the RAMs output the addressed data onto signal buses 41,42,43 and 44 which present the data to shift registers 45, 46, 47 and 48, respectively.

Referring again to FIG. 2, control element 32 is constructed such that shortly after the access time of RAMs 37–40 has elapsed, a new time frame as described previously is initiated by the 1 of 16 signal (which is present on lead 34). The 1 of 16 signal serves to enable the shift registers 45–48 into their data latching mode, so that upon receiving the next 1 GHz clock pulse, they will load the data on buses 41, 42, 43,and 44 into the storage latches located internal to the shift registers 45, 46, 47 and 48 (respectively).

The next 15 clock pulses following (as depicted in FIG. 5) cause the data latched in the shift registers 45, 46, 47, 48 to be sequentially shifted out of the shift registers 45–48, thus creating a multiplexer means. As soon as the data has been latched into shift registers 45–48, the data present on buses 41–44 is redundant. Therefore, the next memory access cycle of the second memory means (the ECL RAMs 37–40) is initiated on the rising edge of the clock/16 signal. It is by the means and method of concurrently shifting data out of shift registers 45–48 while accessing the memory means (ECL RAMs 37–40) to obtain the data necessary for the next time frame, that the bandwidth for each bank of output memory is increased.

The result of applying this method of increasing the output memory bandwidth of the memory means of a DPSG, to the architecture for a DPSG as described above, is to produce a DPSG which is capable of operating at 1 gigasample per second, with output pulse duration of up to 4 microseconds.

As previously described, this bank of the output memory (comprising ECL RAMs 37–40 and GaAs shift registers 45–48), and the output memory controller (Item 17 in FIG. 1), comprising 8 bit counter control circuit 35, controller element 32 and miscellaneous support electronics (which need not be shown), provide an interface between the waveform memory controller 16 of FIG. 1 and the digital to analog converter 19 of FIG. 1. The purpose of the output memory controller 17 and output memory 18 is to receive the digital data from the waveform memory controller 16 of FIG. 1 and to convert that data into high speed serial data streams.

Figure 3:
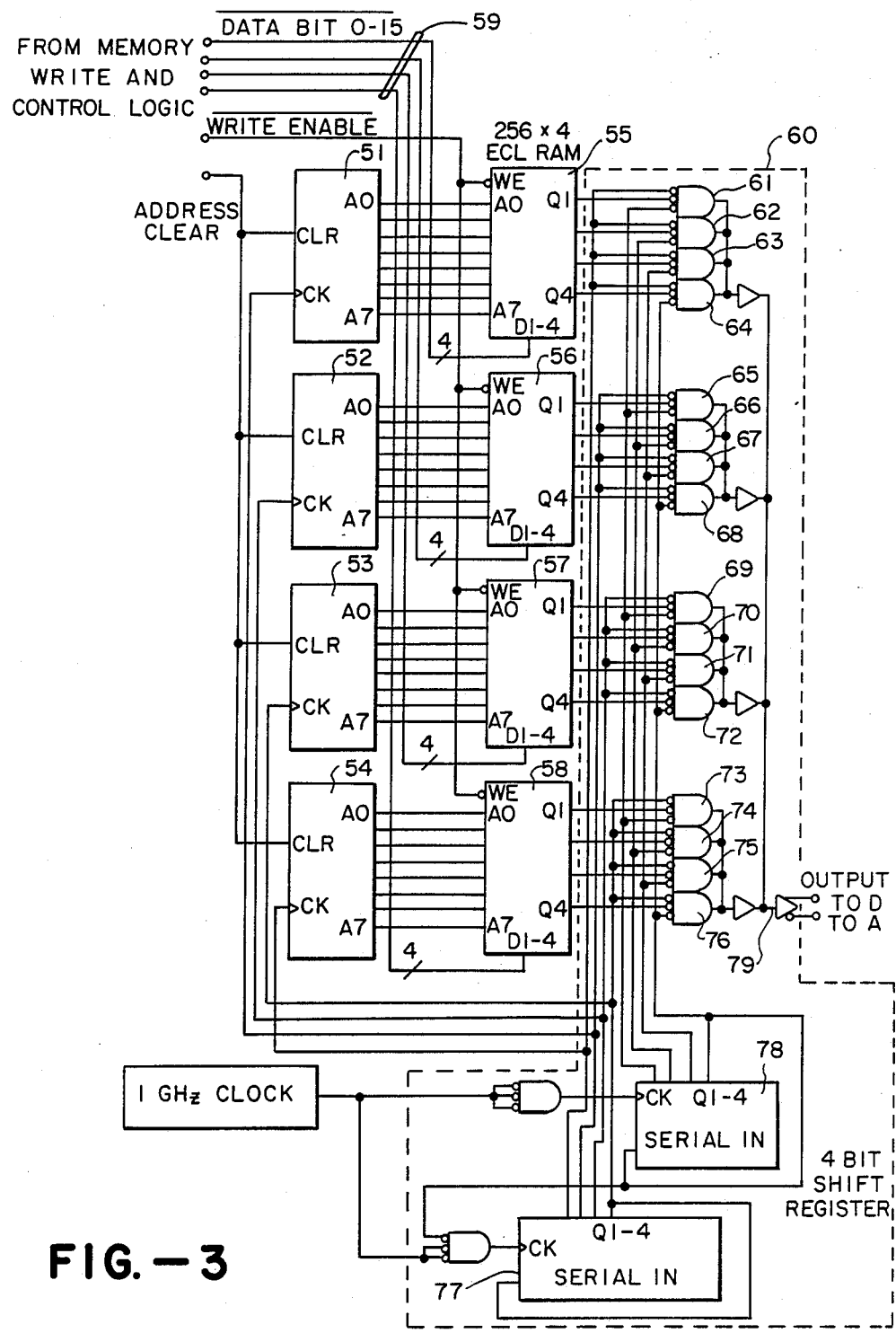
FIG. 3 depicts a block diagram of another preferred embodiment of the output memory controller and of one bank of the output memory which forms a portion of FIG. 1.

Referring now to FIG. 3, a diagram of another preferred embodiment of an output memory controller 17 and one bank of the output memory 18 of FIG. 1 is shown in schematic detail. In FIG. 3, four 7 ns 256×4 RAMs and a 16:1 GaAs multiplexer provide the multiplexing of parallel banks of ECL memory to form a 1 gigabit per second serial output.

In FIG. 3, the counters 51, 52, 53, 54 serve as independent address generators and are bused to their respective ECL RAMs 55, 56, 57, 58. The RAMs 55–58 store digital data which is received via the data bus 59 from a first memory means (the control logic for this interface need not be shown). The output from the ECL RAMs is input into a GaAs 16:1 multiplexer 60. The output on lead 79 of FIG. 3 is a single serial bit stream and it is understood that the output memory 18 of FIG. 1 is comprised of parallel banks, and FIG. 3 shows one of the banks and circuitry for its control. Each bank of the output memory 18 is architecturally equivalent to and operates in parallel with the other banks, and is controllable from a common output memory controller 27.

In FIG. 3, each ECL RAM 55–58 provides the multiplexer 60 with a 4 bit parallel input every 16 ns and maintains this data for at least 4 ns. The multiplexer 60 is comprised of 16 GaAs AND gates 61–76, a 4 bit GaAs ring counter 77, and bank select circuitry 78. The ring counter 77 and bank select circuitry 78 create a circular 16 bit address generator which when ANDed with the parallel RAM outputs, produces a 16:1 multiplexer. The maximum pulse duration is limited by the size of the RAMs and can range up to approximately 4 microseconds in this embodiment.

Referring now to FIG. 4, a schematic diagram of a digital to analog converter (DAC) is depicted which implements a hybrid GaAs device with a design analogous to that of lower speed silicon DACs. The DAC 19 is depicted in block diagram form in FIG. 1. In FIG. 4, a 2 bit DAC is depicted, although other configurations are possible. For example, configurations such as 6 or more bit DACs are possible.

In FIG. 4, the functions of transistors Q1, Q2 and Q3 are duplicated in transistors Q4, Q5 and Q6, respectively. The DAC of FIG. 4 has an identical current and switching stage for each input data bit. The stages drive a resistive ladder network. The power supply voltages in use in the DAC are chosen to enable the digital GaAs chips to drive the DAC directly.

Transistors Q3 and Q6 form two identical current sources. The form of the current source is relatively immune to device and environmental variations and does not require separate voltage references in this application. It should be recognized that other DAC designs are possible for use with the present invention, and that the depiction in FIG. 4 is for describing one suitable digital to analog converter.

In FIG. 4, an analog output voltage is formed by passing switched current through a resistive ladder. By passing equal currents into different nodes of the R-2R ladder in base two combinations, base two voltage steps are presented to the output.

Tests were conducted on a digital to analog converter according to the present invention to create a 1 gigasample per second digital waveform generator. The tests involved verification of the digital and analog design rules and evaluation of a digital to analog converter (DAC).

A test rig was fabricated which incorporated a 2-bit GaAs hybrid DAC which was driven by a GaAs counter chip. The circuit was laid out using a combination of microstrip and coplaner microwave design rules. The digital section of the circuitry was implemented on an ultralow permittivity Teflon material (dielectric constant=2.5). The DAC was implemented on a ceramic substrate and used high bandwidth GaAs transistors as current sources and digital switches.

These tests demonstrate typical performance of the design; no attempts were made to optimize the circuit. Even under these constraints, however, the circuit performs well at the requisite 1 gigasample per second. Sample data shown in FIG. 6 was taken at 1.25 gigasamples per second.

FIG. 6 is an enlarged photograph of the output of the DAC as recorded by a Tektronix 7104 oscilloscope. The data shows a repetitive waveform which corresponds to the binary data sequence [00,10,01,11, ... ] produced by the GaAs counter chip. This data sequence was selected because it demonstrates a more challenging switching requirement than would a straight binary ramp (i.e., [00,01,10,11, ... ]). The accuracy of the DAC is clearly shown to be no worse than 1 part in 30. This level of accuracy is sufficient for the construction of a 5-bit or 6-bit DAC. It is believed that careful optimization of the analog circuitry will result in a DAC with a bandwidth of 1.5 gigasamples per second and an accuracy of 1%.

The foregoing description of the two preferred embodiments of the invention have been presented for purposes of illustration and description. This description is not intended to be exhaustive or to limit the invention to the precise form disclosed. Many variations and modifications on this invention are possible. The embodiments were chosen and described in order to best explain the principles of the invention and its particular applications to thereby enable others skilled in the art to best utilize the invention in various modifications as are best suited to the particular use contemplated.

To summarize specific applications of the present invention, the present invention can be used in applications such as Atomic Vapor Laser Isotope Separation (AVLIS) to create an optimal match between the process laser's spectral profile and that of the vaporized material. Other applications include opticaltelecommunications (wherein a laser is modulated with a digital or analog waveform, thus superimposing data onto the laser's optical signal), non-optical telecommunication in the microwave and radio spectrum, radar, electronic countermeasures, high speed computer interconnects, local area networks, high definition video transport and the multiplexing of large quantities of slow digital memory into high speed data streams. It is therefore intended that the scope of the invention be defined by the claims appended hereto.

What is claimed is:

1. A digital waveform generator operating in successive time frames of a predetermined duration where each of said time frames has a plurality of clock cycles, said generator comprising:

first memory means for storing digital data in a plurality of addressable memory locations, second memory means, means for accessing some of said stored digital data and transporting said data into said second memory means, said second memory means having parallel banks for storing digital data in a plurality of addressable memory locations, each of said parallel banks of said second memory means having a second access time within each of said time frames such that selected stored digital data is accessible after said second access time, multiplexer means, means for accessing some of said stored digital data during successive ones of said time frames yet after said second access time from said second memory means to said multiplexer means, said multiplexer means including means for multiplexing within each of said time frames said stored digital data from second memory means within a third access time faster than both said first access time and said second access time to form a digital waveform having a data rate faster than the access time of said second memory means.

2. A generator as in claim 1 wherein said gnerator is programmable.

3. A generator as in claim 1 operating in a pulsed mode wherein said clock cycles are interruptable.

4. A generator as in claim 1 wherein said first memory means are randomly accessible.

5. A generator as in claim 1 wherein said multiplexer means include shift registers.

6. A generator as in claim 1 including digital to analog conversion means for converting said digital waveform into an analog waveform.

7. A generator as in claim 1 wherein said clock cycles occur at or above 1 gigahertz.

8. A generator as in claim 1 wherein said multiplexing means include Gallium Arsenide digital circuits.

9. A generator as in claim 1 wherein said generator operates in a continuous mode.

10. In a digital waveform generator operating in successive time frames of a predetermined duration where each of said time frames has a plurality of clock cycles, said generator comprising first memory means for storing digital data in a plurality of addressable memory locations and second memory means, the method comprising the steps of:
   accessing some of said stored digital data during successive ones of said time frames and transporting said data into said second memory means, and
   multiplexing within each of said time frames said stored digital data from said second memory means after a second accesstime, to form a digital waveform having a data rate faster than the access time of said second memory means.

* * * * *